(12) United States Patent
Muraki et al.

(10) Patent No.: US 7,660,548 B2
(45) Date of Patent: Feb. 9, 2010

(54) IMAGE PROCESSING DEVICES

(75) Inventors: Motohito Muraki, Nagoya (JP);
Takamitsu Kawai, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 316 days.

(21) Appl. No.: 11/691,953

(22) Filed: Mar. 27, 2007

(65) Prior Publication Data
US 2007/0228644 A1 Oct. 4, 2007

(30) Foreign Application Priority Data
Mar. 31, 2006 (JP) ............................. 2006-097788

(51) Int. Cl.
*G03G 15/00* (2006.01)
(52) U.S. Cl. ........................ 399/107; 399/124
(58) Field of Classification Search ................ 399/107
See application file for complete search history.

(56) References Cited

U.S. PATENT DOCUMENTS

| 6,375,181 B1 * | 4/2002 | Kawano et al. | 270/58.12 |
| 7,029,006 B2 * | 4/2006 | Izumi et al. | 271/145 |
| 7,147,218 B2 | 12/2006 | Izumi et al. | |
| 2006/0088336 A1 * | 4/2006 | Hirose et al. | 399/110 |

FOREIGN PATENT DOCUMENTS

| JP | H05-147323 A | 6/1993 |
| JP | H08-211666 A | 8/1996 |
| JP | H10-199364 A | 7/1998 |
| JP | H11-249365 A | 9/1999 |
| JP | 2000-137419 A | 5/2000 |
| JP | 2002-166573 A | 6/2002 |
| JP | 2003-200634 A | 7/2003 |
| JP | 2004-090285 A | 3/2004 |
| JP | 2004-216657 A | 8/2004 |
| JP | 2005-049446 A | 2/2005 |

OTHER PUBLICATIONS

Machine Translation of JP 2002-166573, Seiko Epson Corp.*

* cited by examiner

*Primary Examiner*—David M Gray
*Assistant Examiner*—Roy Yi
(74) *Attorney, Agent, or Firm*—Baker Botts, LLP

(57) ABSTRACT

An image processing device includes a first and second rotating member configured to selectively rotate between an open position and a closed position, and a first and second actuator configured to rotate in sync with the first rotating member and the second rotating member, respectively. The image processing device also includes a light sensor including a light emitter configured to emit a light, and a light receptor positioned opposite the light emitter. The light receptor is configured to receive the light from the light emitter, and a space is formed between the light emitter and the light receptor. In addition, the first actuator is selectively positioned within the space and outside of the space based on the position of the first rotating member, and the second actuator is selectively positioned within the space and outside of the space based on the position of the second rotating member. Moreover, the light sensor detects whether the first rotating member is in the open position or the closed position based on whether the first actuator is positioned within the space or outside of the space, and the light sensor detects whether the second rotating member is in the open position or the closed position based on whether the second actuator is positioned within the space or outside of the space.

9 Claims, 16 Drawing Sheets

IMAGE PROCESSING DEVICES

CROSS-REFERENCING RELATED APPLICATION

The present invention claims priority from Japanese Patent Application Publication No. JP-2006-097788, which was filed on Mar. 31, 2006, the disclosure of which is incorporated herein by reference in its entirety.

BACKGROUND OF THE INVENTION

1. Field of the Invention

The present invention relates generally to image processing devices, such as multifunction devices, which are configured to detect an opening and a closing of parts of image processing devices, which rotate relative to a body of the image processing device.

2. Description of Related Art

Known multifunction devices, such as the multifunction devices described in Japanese Patent Publication Nos. H10-199364 and H11-249365, may detect the opening and the closing of two rotating parts, e.g., two covers or two doors, using a single, contact-type sensor. Specifically, the known multifunction devices include a single micro switch configured to move between a pressed position and released position, and an action member is positioned, such that the action member presses the switch activator when two rotating parts are closed simultaneously, and releases the switch activator when at least one of the two rotating parts is released. Consequently, whether the two rotating parts are open or closed may be determined based on whether the switch activator is in the pressed position or in the released position. Nevertheless, the known multifunction devices may not be configured to determine whether three or more rotating parts of the multifunction device are open or closed using a single sensor.

SUMMARY OF THE INVENTION

Therefore, a need has arisen for image processing devices which overcome these and other shortcomings of the related art. A technical advantage of the present invention is that it may be determined whether any one of a plurality of different rotating members are in an open position or a closed position based on whether a light path in a single light sensor is blocked or opened, without increasing a size of the image processing device.

According to an embodiment of the present invention, an image processing device comprises a first rotating member configured to selectively rotate between a first open position and a first closed position, a second rotating member configured to selectively rotate between a second open position and a second closed position, a first actuator configured to rotate in sync with the first rotating member, and a second actuator configured to rotate in sync with the second rotating member. The image processing device also comprises a light sensor comprising a light emitter configured to emit a light, and a light receptor positioned opposite the light emitter. The light receptor is configured to receive the light from the light emitter, and a space is formed between the light emitter and the light receptor. In addition, the first actuator is selectively positioned within the space and outside of the space based on the position of the first rotating member, and the second actuator is selectively positioned within the space and outside of the space based on the position of the second rotating member. Moreover, the light sensor detects whether the first rotating member is in the first open position or the first closed position based on whether the first actuator is positioned within the space or outside of the space, and the light sensor detects whether the second rotating member is in the second open position or the second closed position based on whether the second actuator is positioned within the space or outside of the space.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

DETAILED DESCRIPTION OF THE EMBODIMENTS

Embodiments of the present invention and their features and technical advantages may be understood by referring to FIGS. 1-16, like numerals being used for like corresponding portions in the various drawings.

Figure 1:
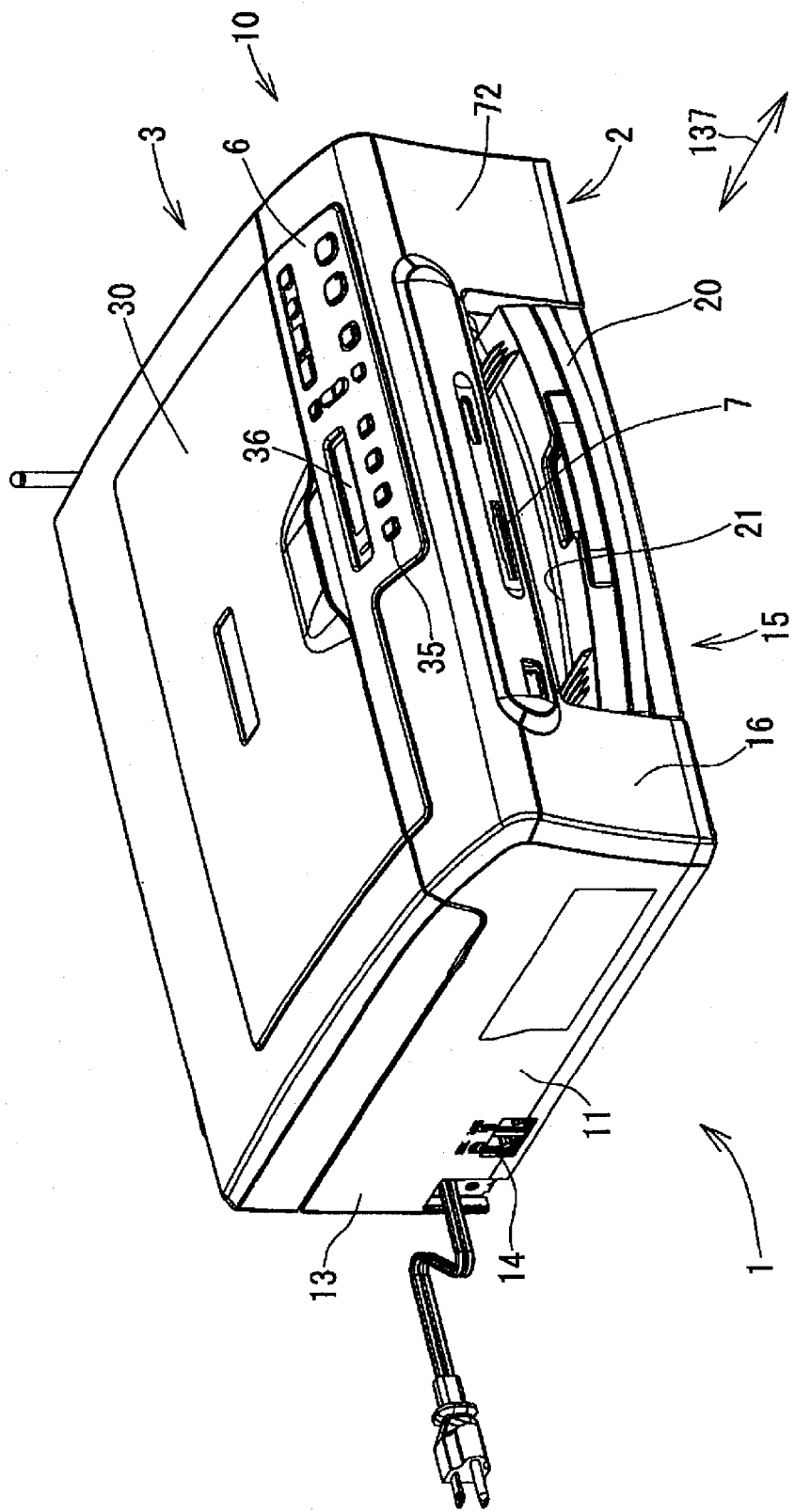
FIG. 1 is a perspective view of a multifunction device, according to an embodiment of the present invention.
Figure 2:
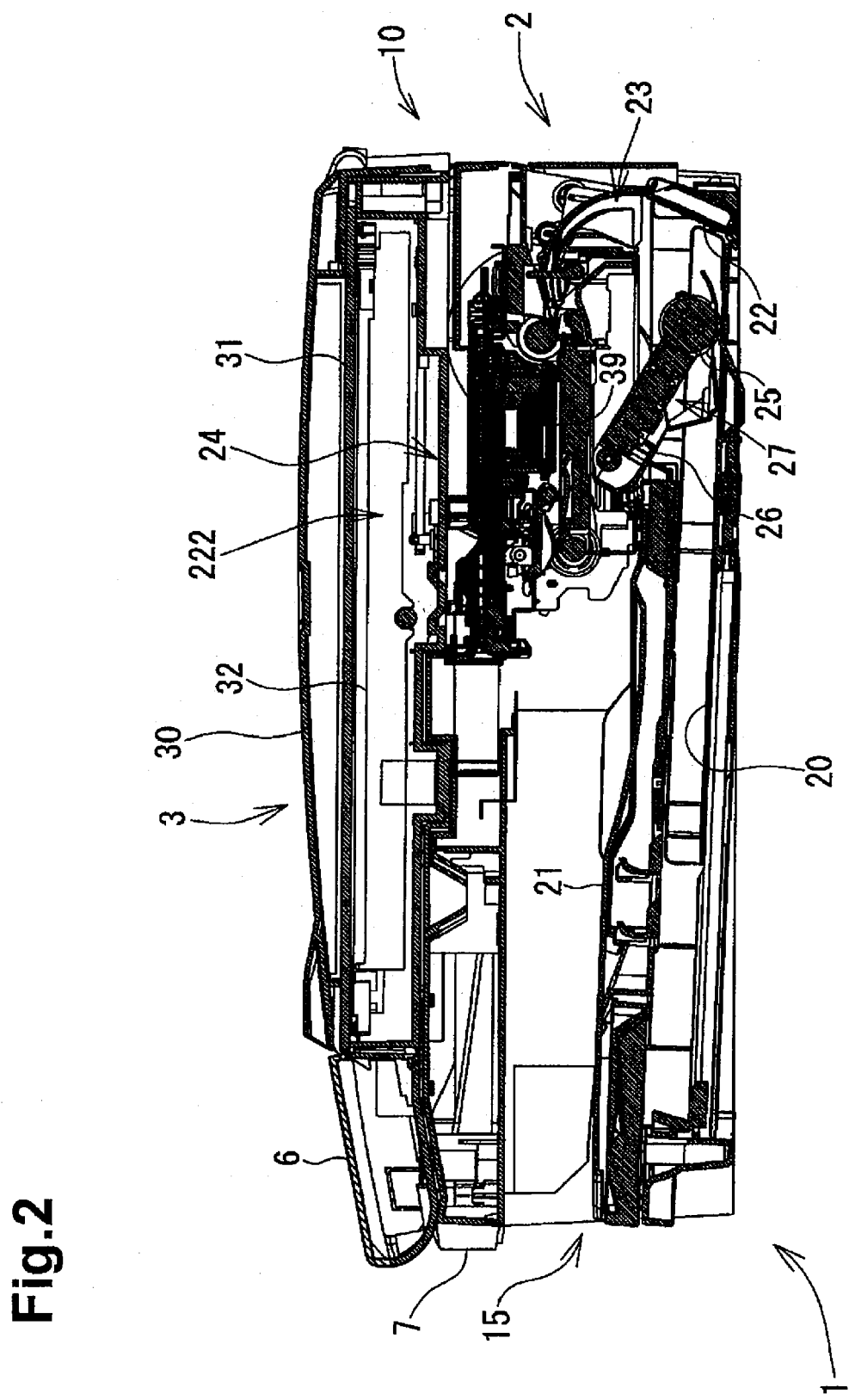
FIG. 2 is a cross-sectional view of the multifunction device of FIG. 1.

Referring to FIGS. 1 and 2, a multifunction device 1 may be configured to perform a plurality of functions, such as a printing function, a scanning function, a copying function, a talking function, a facsimile function, or the like, and any combination thereof. For example, the multifunction device may comprise a device body 10 comprising a scanner 3 for reading image data from a document, and a printer 2 for recording images onto a recording medium. In an embodiment, the scanner 3 may be disposed on the printer 2.

Figure 5:
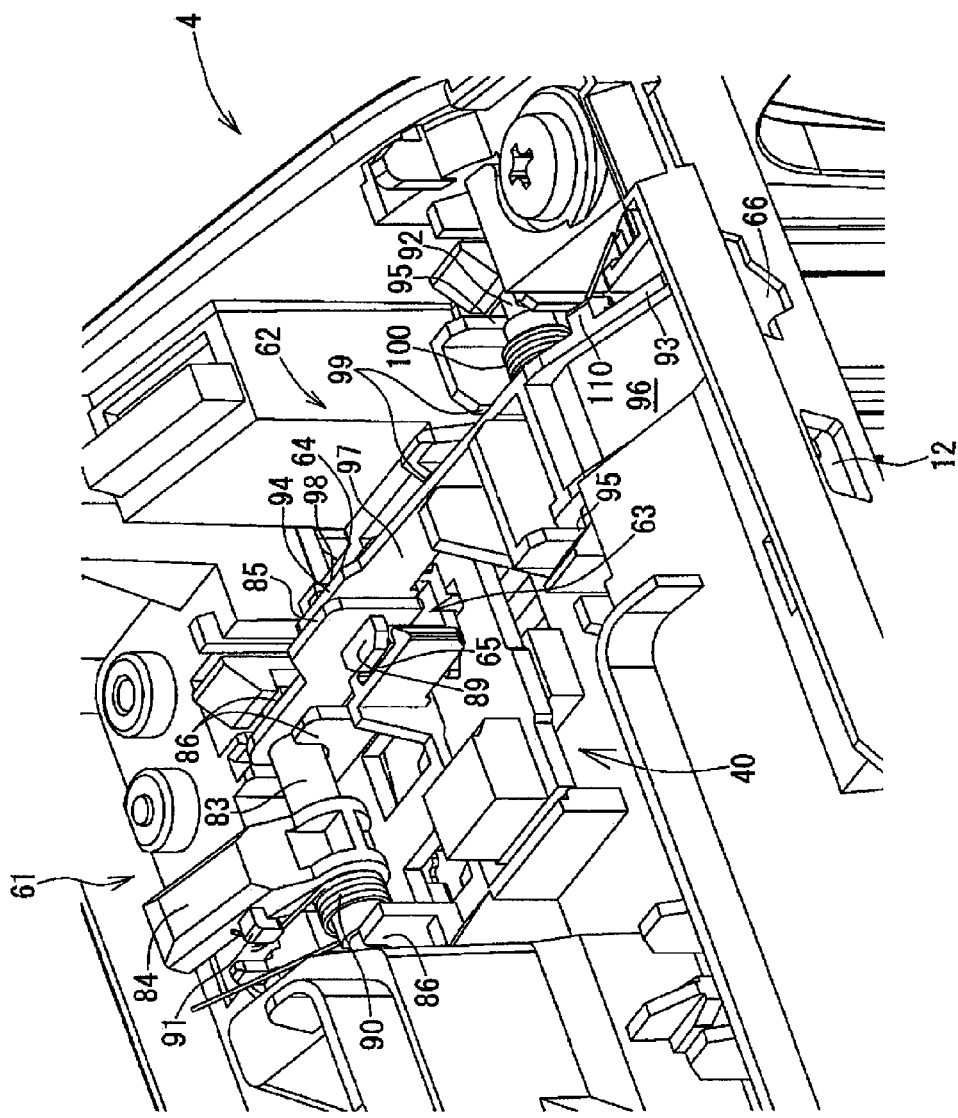
FIG. 5 is a magnified, perspective view of a detector which is configured to detect whether the scanner and the door are in the open position or are in a closed position.
Figure 6:
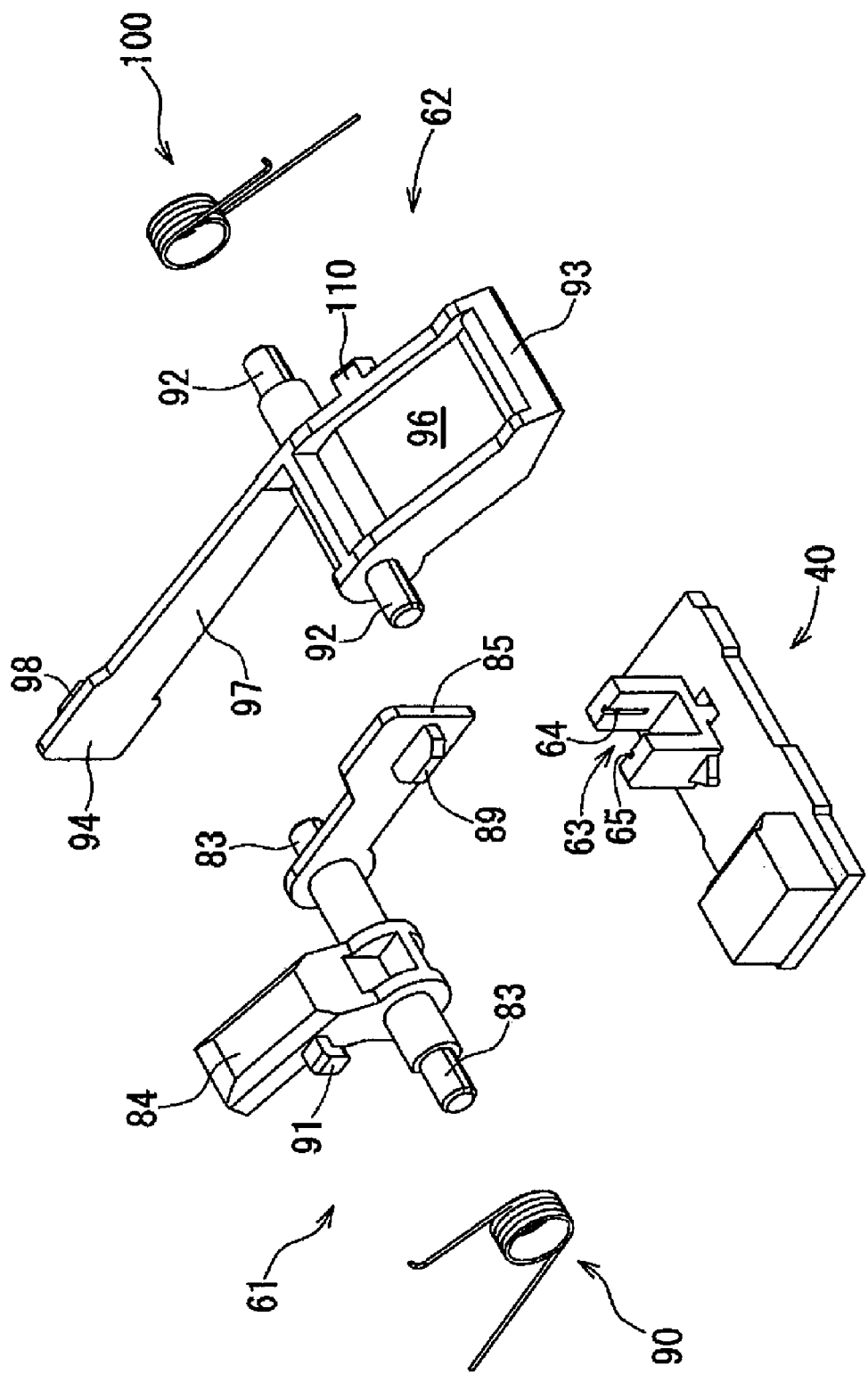
FIG. 6 is a cutaway, perspective view of the detector comprising a first actuator and a second actuator, and a light sensor positioned on the actuator.

The multifunction device 1 also may comprise a plurality of rotating parts which are configured to be selectively moved between an open position and a closed position, and vice versa. Referring to FIGS. 5 and 6, the multifunction device 1 may comprise a light sensor 40 which is configured to detect the opening and the closing of the rotating parts of the multifunction device 1. For example, in an embodiment, the scanner 3 may be configured to rotate with respect to the printer 2, and a door 72 may be configured to rotate with respect to a frame 11 of the printer 2 to allow access to the interior of the printer 2. Moreover, light sensor 40, e.g., an optical sensor, is configured to detect the opening and closing of the scanner 3 and the door 72.

In an embodiment, the multifunction device may be connected to a computer (not shown), and the printer 2 may record images or text onto a recording media, such as recording medium, e.g., recording paper, based on the image data or text data received from the computer. The printer 2 also may record image data received from an external device, such as a digital camera, or from a storage medium, such as a memory card. Moreover, image data read from the scanner 3 may be transmitted to the computer, may be stored onto the memory card, or may be recorded onto the recording medium by the printer 2, or any combination thereof. In addition, using the talk function, sound may be transmitted as electrical signals through a phone line (not shown), and using the facsimile function, image data read by the scanner 3 may be transmitted as an electrical signal over the phone line. The received facsimile data may be recorded onto the recording medium by the printer 2, and a connection 14 may be installed on a side 13 of the device body 10.

An opening 15 may be formed on the front of the printer 2, and a feed tray 20 and a delivery tray 21 may be mounted inside the opening 15. The feed tray 20 may store the recording medium. For example, the feed tray 20 may store different sizes of recording medium, such as A4 size, B5 size, and postcard size. The tray of the feed tray 20 may be expanded by sliding it out towards the front of the device, and the expanded feed tray 20 may store legal size recording medium. Recording medium stored in the feed tray 20 may be fed to the interior of the printer 2, printed with a selected image, and delivered to the delivery tray 21.

The scanner 3 may be a flatbed scanner, and the device body 10 may comprise a cover 30 which is configured to move between the open position and the closed position, and vice versa. A platen glass 31 and a contact image sensor 32 may be positioned below the cover 30. In operation, documents may be positioned on the platen glass 31, and the contact image sensor 32 may be configured to move back and forth to scan an image from the document.

The device body 10 may comprise a control panel 6 which controls the printer 2 and the scanner 3, and is positioned at the top front area of the device body 10. The control panel 6 may comprise a plurality of control buttons 35 and an LCD display 36, and the multifunction device 1 may operate, at least in part, based on instructions received via the control panel 6. Moreover, when an external computer is connected to the multifunction device 1, the multifunction device 1 may be operated based on instructions received from the computer via a printer driver or a scanner driver.

The device body 10 also may comprise a slot 7 positioned on the front of the device body 10, and a storage media, such as a memory card, may be inserted into the slot 7. Image data stored on the miniature memory card inserted in the slot 7 may be read when the control panel 6 is operated, and information associated with the read image data may be displayed on the LCD display 36. An image may be selected by operating the control buttons 35, and the selected image may be recorded onto the recording medium by the printer 2.

Referring to FIGS. 1 and 2, a feed tray 20 may be positioned on the bottom of the device body 10, and the feed tray 20 may be removed by moving the feed tray 20 in the direction of the arrow 137. When the feed tray 20 is inserted into the interior of the multifunction device 1, the recording medium is pulled to the right in FIG. 2 by a feed roller 25, and is sent to an image recording unit 24 along a paper delivery route 23. Moreover, a user of the multifunction device may position recording medium within the feed tray 20 by removing the feed tray 20 from the interior of the multifunction device 1.

An inclined separator 22 may be positioned at the rear of the feed tray 20, and the inclined separator 22 may be inclined towards the rear of the multifunction device 1. The inclined separator 22 separates recording medium sent from the feed tray 20 and guides it in an upward direction. The paper delivery route 23 may be formed above the inclined separator 22, and the paper delivery route 23 goes up from the inclined separator 22 and then bends towards the front. The paper feed route 23 extends from the rear of the device body 10 to the front, and is connected to the delivery tray 21 after passing through the image recording unit 24. Recording medium stored in the feed tray 20 is guided upwards through the paper feed route 23, and then makes a U-turn to reach the image recording unit 24. After an image has been recorded by the image recording unit 24, the paper is delivered to the delivery tray 21.

Figure 3:
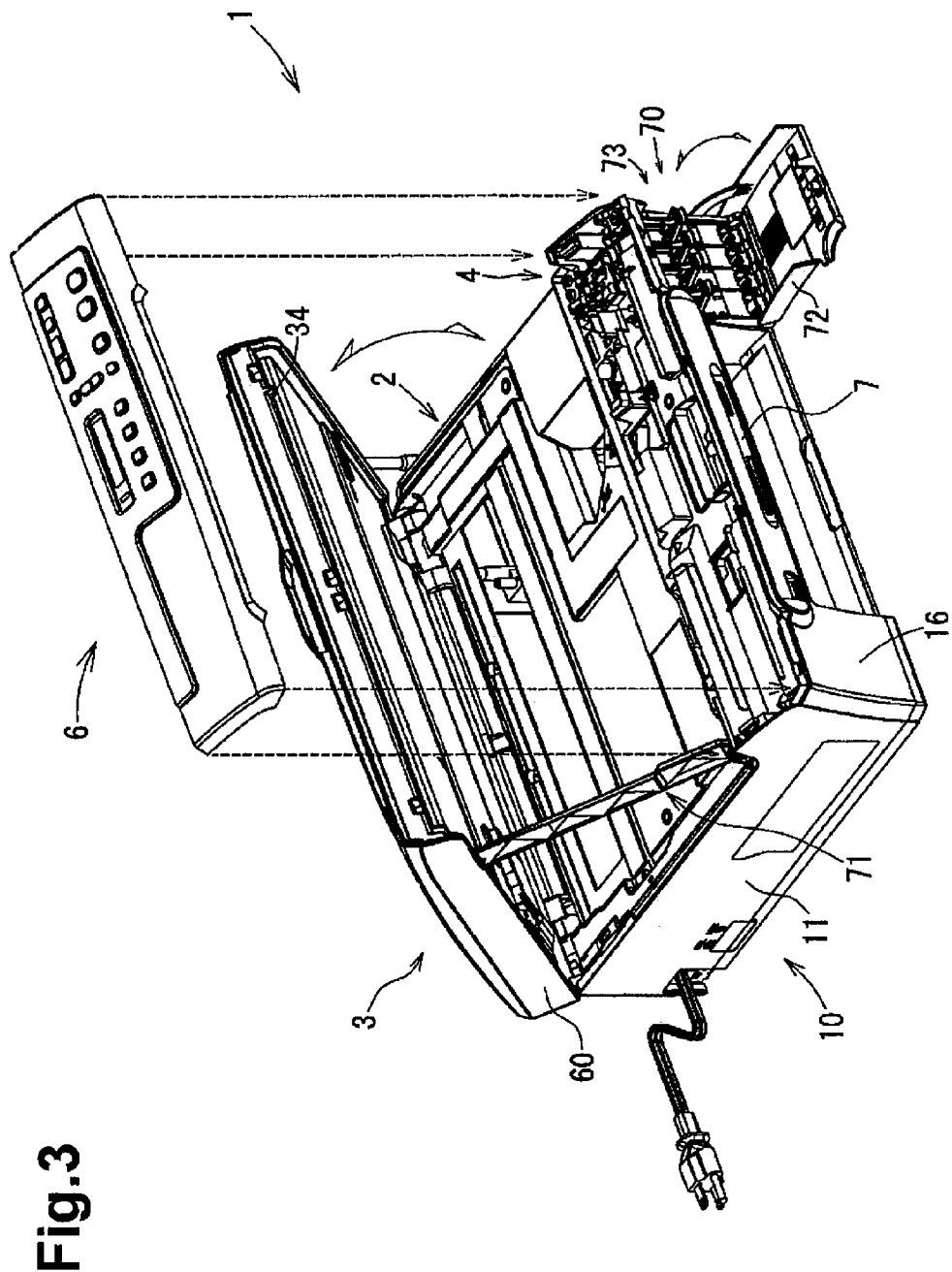
FIG. 3 is an external, perspective view of the multifunction device of FIG. 1, in which a scanner and a door of the multifunction device are in an open position.

Referring to FIG. 3, a casing 60 of the scanner 3 may be supported on the printer 2 with the rear of the multifunction device 1 acting as a fulcrum enabling it to rotate. This allows the scanner 3 to open upwards from the printer with the end on the front of the multifunction device 1 as the free end. The control panel 6 is affixed to the printer 2 side, and does not open or close with the scanner 3. When the scanner 3 is in the open position, the interior of the printer 2 is exposed, which allows maintenance work, such as dealing with paper jams, to be performed on the multifunction device 1.

A support member 71 may be installed between the printer 2 and the scanner 3, and the support member 71 may comprise a flat plate. The base end of the support member 71 may be connected to the top of the printer 2 on the front of the multifunction device 1. The support member 71 may extend in the depth direction of the multifunction device 1, and the side of the support member 71 adjacent to the rear of the multifunction device 1 may the rotation tip which may be freely slid onto the casing 60. When the scanner 3 is in the open position, the support member 71 supports the scanner 3 in the manner of a corner brace.

Figure 4:
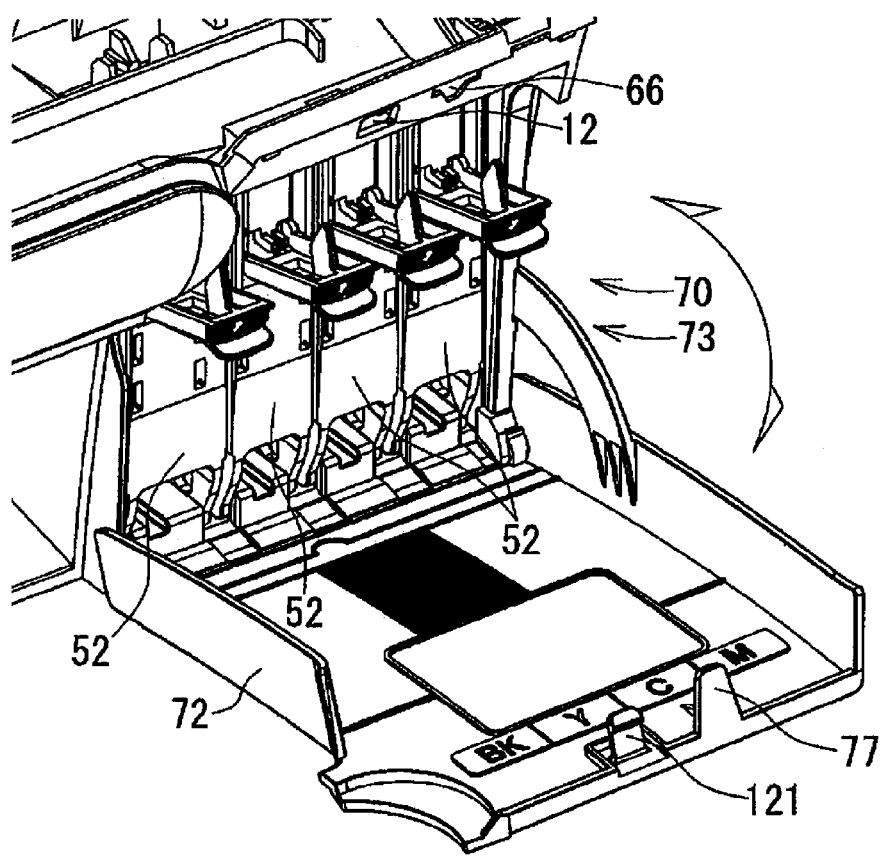
FIG. 4 is a magnified, perspective view of the door in the open position.
Figure 10:
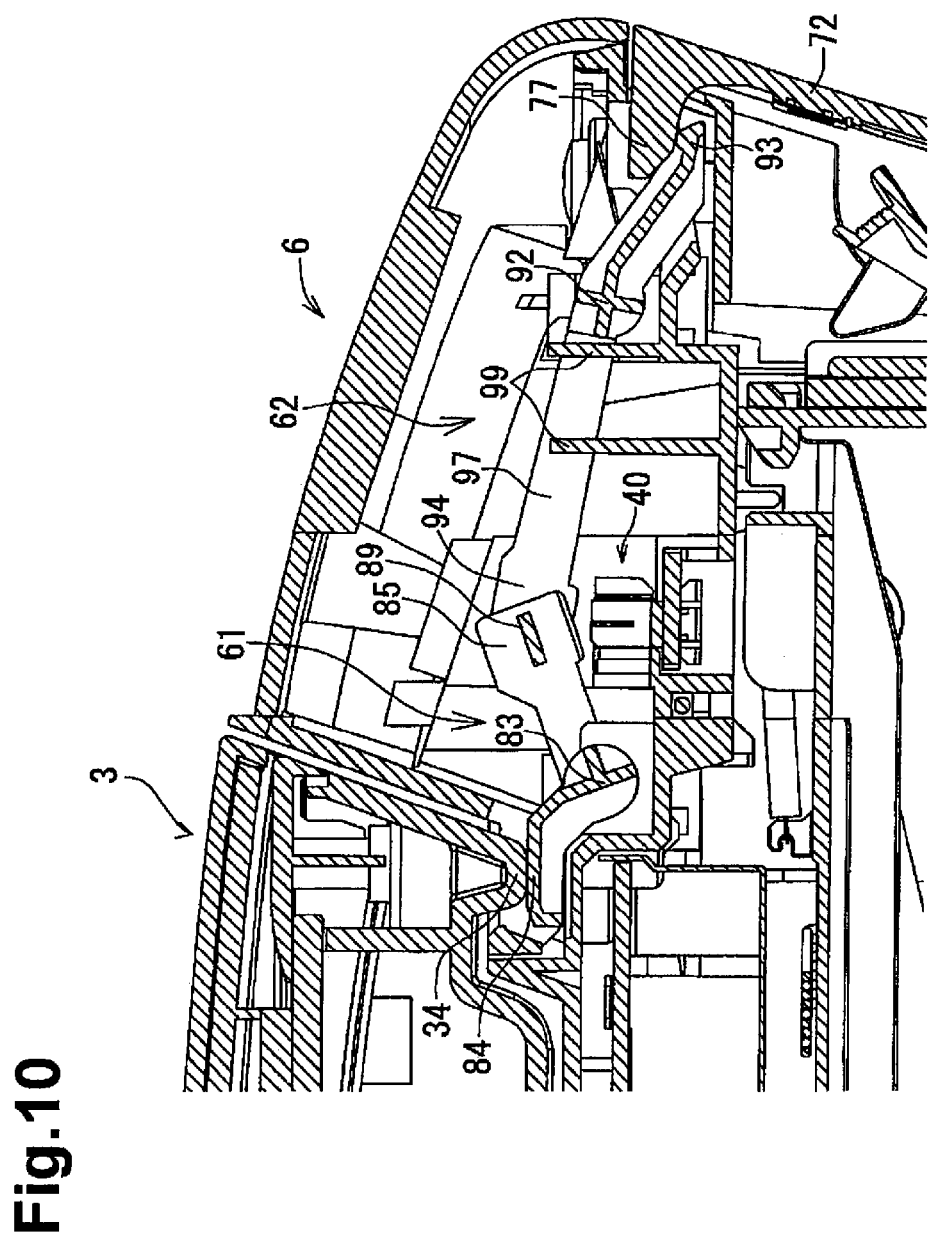
FIG. 10 is a magnified view of some of the elements of FIG. 9.

Referring to FIGS. 3, 4, and 10, the printer 2 may comprise a refill unit 70, and the refill unit 70 may be positioned adjacent to the front of the printer 2 housing 10. In an embodiment of the present invention, the refill unit 70 may be configured to store four ink cartridges 52, and the four ink cartridges 52 may store black (Bk) ink, yellow (Y) ink, magenta (M) ink, and cyan (C) ink, respectively. The ink stored in the ink cartridges 52 may be supplied to a recording head 39 of the printer 2 via an ink tube 41.

The front panel 16 of the housing 11 of the printer 2 may comprise the door 72, and the door 72 selectively opens and closes the opening 73 located on one end of the front panel in order to provide access the interior of the printer 2. Opening and closing the door 72 may be performed by rotating the door outwards towards the front of the multifunction device 1 on a rotating axis contained in the lower edge of the door. Moreover, the housing 11 of the printer 2 have a fastening hole 12 formed therethrough, which holds the door 72 in the closed position when a fastener 121 on the door 72 is fastened to the fastening hole 12.

Referring to FIGS. 3 and 5, a detector 4 may be mounted on the right edge of the front of the multifunction device 1 and on the top of the printer 2 housing 11. The detector 4 may be configured to detect whether the scanner 3 and the door 72 are in the open position or the closed position. For example, the detector 4 may comprise a light sensor 40, e.g., an optical sensor, a first actuator 61, and a second actuator 62.

The first actuator 61 and the second actuator 62 may be configured to rotate, and light sensor 40 may be configured to optically detect the rotating position of the first actuator 61 and the second actuator 62. Referring to FIG. 6, a light emitter 64 and a light receptor 65 may be positioned opposite each other across a space 63. The first actuator 61 and second actuator 62 each enter and exit the space 63 of the light sensor 40.

A light emitter 64 may be an optical semiconductor which illuminates when a current passes through it, for example a Light Emitting Diode ("LED"). The light emitter 64 may emit near infra-red light because near infra-red light has stronger light output than visible light. Moreover, the light emitter 64 may light up either by direct current or by pulse current.

A light receptor 65 outputs current based on the strength of the received light. The light receptor 65 may comprise a photo IC combining a photodiode and an IC, or a phototransistor combining a photodiode and a transistor, or the like. The light receptor 65 may be installed across the space 63 as a counterpart to the light emitter 64. When the space 63 is open, light from the light emitter 64 is received by the light receptor 65, such that the light path for light from the light emitter 64 to the light receptor 65 is open, a current corresponding to the strength of the light received by the light receptor 65 is output by the light receptor 65. In contrast, when the space 63 is not open, light from the light emitter 64 is not received by the light receptor 65, such that current is not output from the light receptor 65 when the light path for light from the light emitter 64 to the light receptor 65 is blocked.

As described above, the first actuator 61 and the second actuator 62 selectively move in and out of the space 63, such that light sensor 40 acts as photo-interrupter, because the first actuator 61 or the second actuator 62 are detected when the path for light from the light emitter 64 to the light receptor 65 is blocked when the first actuator 61 or the second actuator 62 enters the space 63.

In operation, the first actuator 61 and the second actuator 62 may rotate in sync with their respective rotating parts. Specifically, the first actuator 61 may rotate in sync with the opening and the closing of the scanner 3, and the second actuator 62 may rotate in sync with the opening and closing of the door 72. The first actuator 61 enters and exits the space 63 of the light sensor 40, thereby closing the light path between the light emitter 64 and the light receptor 65 in sync with the opening of the scanner 3, and opening the light path in sync with the closing of the scanner 3. Similarly, the second actuator 65 enters and exits the space 63 of the light sensor 40, thereby closing the light path between the light emitter 64 and the light receptor 65 in sync with the opening of the door 72, and opening the light path in sync with the closing of the door 72.

Figure 7:
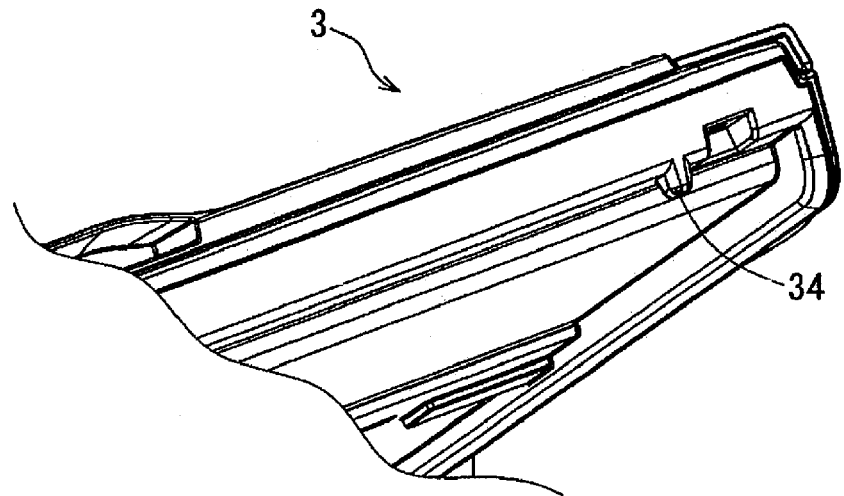
FIG. 7 is a magnified, perspective view of a pusher mounted on the underside of the scanner.

Referring to FIGS. 5-7, the first actuator 61 may comprise a shaft 83, a contact 84, and a shield 85. The shaft 83 may be supported by the device body 10. For example, the two ends of the shaft 83 may be supported by bearings 86 installed on the top of the housing 11 of the printer 2 on the right edge of the front of the multifunction device 1, in such a way as to rotate freely. The contact 84 may be contacted by the scanner 3. For example, the contact 84 may be contacted by a first pusher 34 protruding downwards from the right edge of the front of the multifunction device 1 on the underside of the scanner 3. Moreover, the contact 84 may extend radially from the axis of rotation of the shaft 83. Consequently, the contact 84 may rotate around the shaft 83 when it contacts the first pusher 34.

The shield 85 may extend radially from the axis of rotation of the shaft 83, and may protrude from one side of the contact 84 towards the side opposite the contact 84 relative to the shaft 83. This allows the shield 85 to rotate around the shaft 83 together with the contact 84, such that it will enter and exit the space 63. The shield 85 may comprise a stopper 89 which positions the shield 85 in a blocking position when it comes in contact with the light sensor 40. The stopper 89 may be perpendicular to one surface of the shield 85, e.g., the surface opposite the surface which faces the shield 94 of the second actuator 62. When the first actuator 61 rotates in such a way that the shield 85 moves into the space 63, the stopper 89 contacts the light receptor 65. In this position, the shield 85 is in the blocking position. As such, stopper 89 stops the shield 85 at a predetermined position where the shield 85 completely blocks the light path when the first actuator 61 rotates in the direction in which the shield 85 progresses into the space 63 of the light sensor 40. Moreover, the shield 85 may have a substantially flat plane shape which extends in the direction of rotation.

Moreover, the bearing 86 which supports the shaft 83 on the side where the shield 85 is positioned may prevent the shield 85 from moving perpendicular to the direction of rotation of the shield 85. Consequently, the bearing 86 also may function as a guide member which guides the shield 85 of the first actuator 61 into and out of the predetermined position in the space 63 of the light sensor 40.

In an embodiment, the first actuator 61 may comprise a helical coil spring 90. The coiled portion of the helical coil spring 90 may be inserted onto the shaft 83, and one end of the arm may contact the top of the housing 11, such that the other end of the arm engages a catch 91 on the side of the contact 84. Consequently, the first actuator 61 may be biased by the helical coil spring 90 in the direction in which the shield 85 moves into the space 63 of the light sensor 40.

In an embodiment, the second actuator 62 may comprise a shaft 92, a contact 93, and a shield 94. The shaft 92 may be supported on the device body 10. For example the two ends of the shaft 92 may be supported by bearings 95 installed on the top of the housing 11 of the printer 2 on the right edge of the front of the multifunction device 1, in such a way as to rotate freely. The contact 93 may be contacted by the door 72. For example, referring to FIG. 4, the contact 93 may be contacted by a second pusher 77 protruding towards the interior of the door 72 from the free end of the door 72. Moreover, the contact 93 may extend radially from the axis of rotation of the shaft 92. The contact 93 may rotate around the shaft 92 when it contacts the second pusher 77 of the door 72. In addition, an opening 96 may be formed on the contact 93, such that the tip of the second pusher 77 may be inserted in the opening when the contact 93 is pressed by the second pusher 77. The housing 11 of the printer 2 may have a push hole 66 formed therethrough, such that when the fastener 121 on the door 72 is fastened onto the fastening hole 12, the second pusher 77 is pushed through the push hole 66. In this manner, the contact 93 is pressed when the second pusher 77 is pushed through the push hole 66.

The shield 94 may extend radially from the axis of rotation of the shaft 92, and may be formed via the arm 97 to protrude from one side of the shaft 92 towards the side opposite the contact 93 relative to the shaft 92. This allows the shield 94 to rotate around the shaft 92 together with the contact 93, such that the shield 94 will enter and exit the space 63 of the light sensor 40. Moreover, the shield 94 may have a substantially flat plane shape which extends in the direction of rotation. The shield 85 and the shield 94 may be arranged in parallel, such that their planes are be positioned orthogonally with respect to the light path between the light emitter 64 and the light receptor 65 within the space 63 of the light sensor 40. Specifically, the shield 85 and the shield 94 may be shaped and arranged, such that they do not protrude in the direction of the light path of the light sensor 40. Consequently, the space between the light emitter 64 and light receptor 65, e.g., space 63, may be reduced, such that the size of the light sensor 40 may be reduced.

The shield 94 may comprise a stopper 98 for positioning the shield 94 at a predetermined blocking position when the shield 94 contacts the light sensor 40. The stopper 98 may be mounted perpendicular to one of the surfaces of the shield 94, such as the surface on the opposite side of the surface of the shield 94 that faces the shield 85 of the first actuator 61. When the second actuator 62 rotates in such a way that the shield 94 moves into the space 63, the stopper 98 contacts the light emitter 64 of the light sensor 40. In this position, the shield 94 is in the predetermined blocking position. Consequently, mounting the stopper 98 to stop the shield 94 at the predetermined blocking position where it will completely block the light path blocks the light path when the second actuator 62 is rotated in the direction in which the shield 94 progresses into the space 63 of the light sensor 40.

Referring to FIG. 5, guides 99 may be located at the predetermined positions of the detector 4 on the housing 11 to prevent the shield 94 and the arm 97 from moving in a direction perpendicular to the direction of rotation of the shield 94. At least one slit may be formed on the guide 99 in the direction along which the arm 97 rotates. Consequently, the shield 94 may be guided by the guide 99 in such a way as to enter and exit the space 63 of the light sensor 40 to a predetermined position. Moreover, the predetermined position to which the shield 85 enters and exits light sensor 40 differs from that to which the shield 94 enters and exits the light sensor 40. This prevents the shield 85 of the first actuator 61 from contacting the shield 94 of the second actuator 62 when the shield 94 enters or exits the space 63 of the light sensor 40.

The second actuator 62 may comprise a helical coil spring 100. The coiled portion of the helical coil spring 100 may be inserted onto the shaft 92, and one end of the arm may contact the top of the housing 11 of the printer 2, such that the other end of the arm engages with a catch 110 on the side of the contact 93. Consequently, the second actuator 62 may be biased by the helical coil spring 100 in the direction in which the shield 94 moves into the space 63 of the light sensor 40.

In operation, the first actuator 61 and the second actuator 62 rotate in sync with the opening and closing of the scanner 3 and the door 72, respectively. The first actuator 61 and the second actuator 62 each enter the space 63. The light sensor 40 then optically detects the rotating position of the detectors 61 and 62. In an embodiment, the first actuator 61 and the second actuator 62 comprise a pair of detectors on either side of the light sensor 40. Nevertheless, those of ordinary skill in the art readily will understand that three or more detectors may be used.

Figure 8:
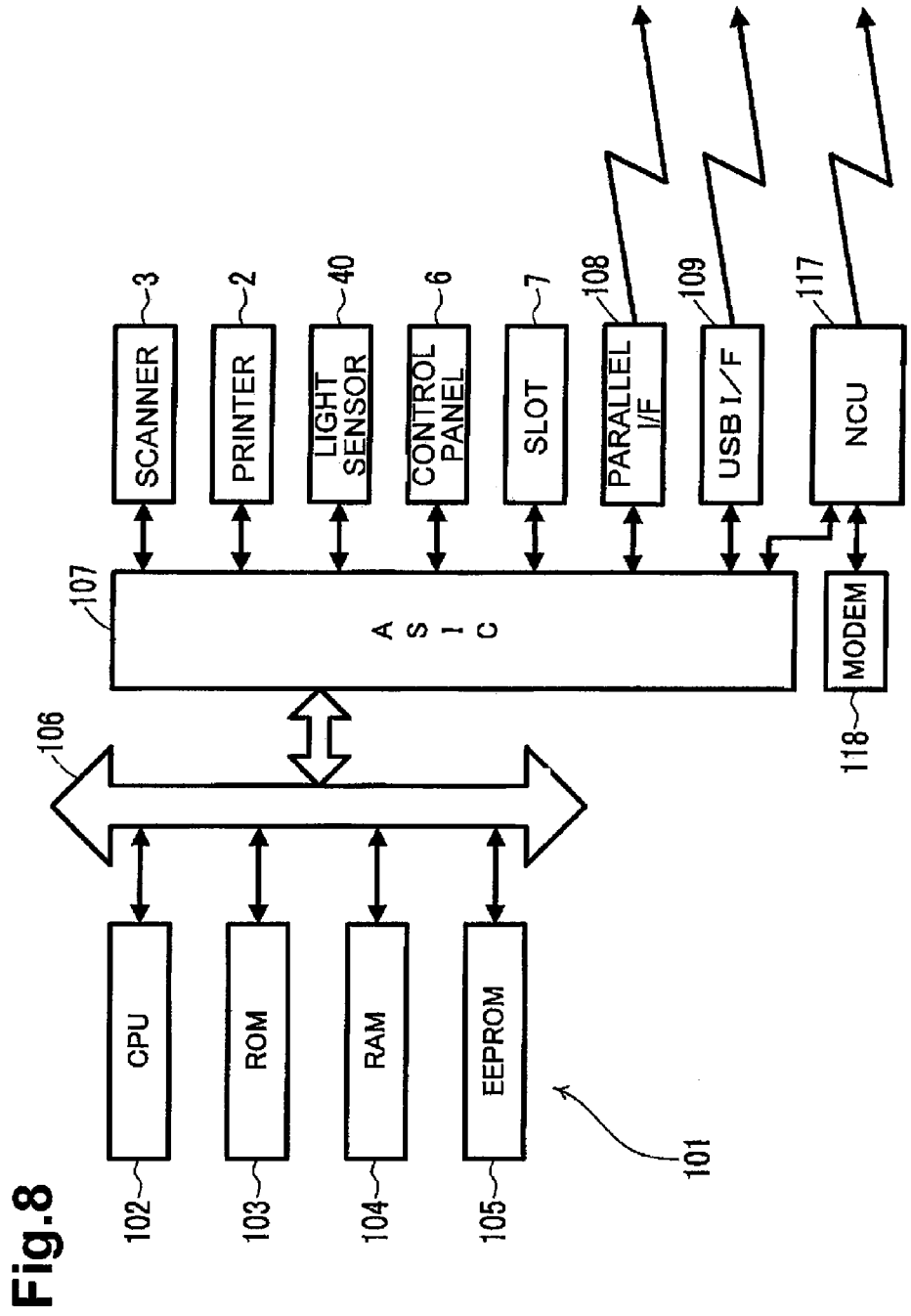
FIG. 8 is a block diagram of a controller of the multifunction device of FIG. 1.
Figure 9:
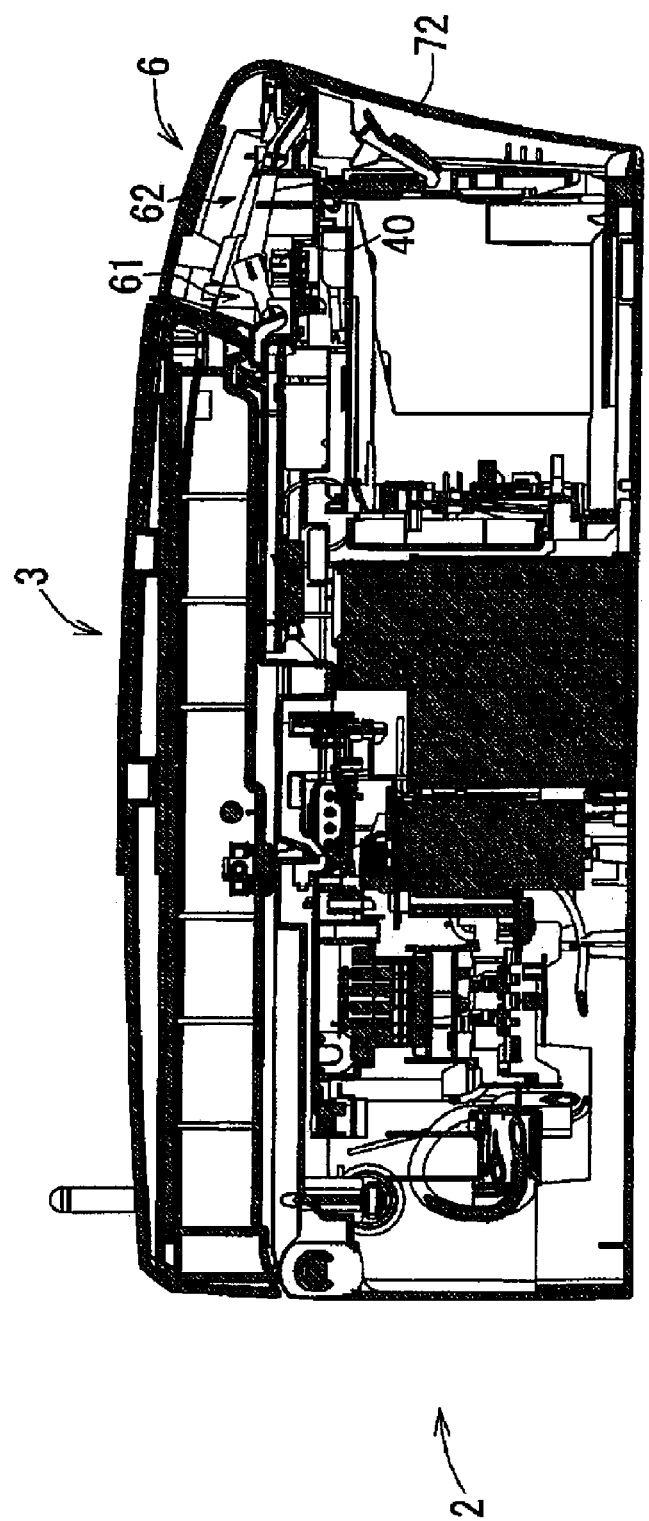
FIG. 9 is a cross-sectional view of the multifunction device of FIG. 1 with the scanner and the door in the closed position.

Referring to FIGS. 8 and 9, the controller 101 may control the operation of the multifunction device 1, including the printer 2 and the scanner 3. The controller 101 may comprise a microcomputer with Read Only Memory ("ROM") 103, Random Access Memory ("RAM") 104, and Electrically Erasable and Programmable ROM ("EEPROM") 105, and may be connected to an Application Specific Integrated Circuit ("ASIC") 107 via a bus 106.

The ROM 103 stores programs and other information used to control the various operations of the multifunction device 1. The RAM 104 is used as a memory area or a work area for temporarily storing a variety of data used when the CPU 102 runs the programs. The EEPROM 105 stores settings, flags, and the like which are to be stored after the power to the controller 101 is turned off.

The ASIC 107 controls the printer 2 in accordance with instructions from the CPU 102. For example, the ASIC 107 may control the rotation of a feed roller 25, the reciprocal movement of a carriage 38, and the driving of a recording head 39 which ejects ink onto the recording medium. The ASIC 107 also may control the scanner 3 in accordance with instructions from the CPU 102, e.g., the ASIC 107 may control the scanning operations of the CIS 32. Moreover, the ASIC 107 may generate a signal for operating the light sensor 40 in accordance with instructions from the CPU 102, and the ASIC 107 may control the operation of the light sensor 40 by sending this signal to the light sensor 40. This causes the light sensor 40 to operate at a predetermined time, detecting whether the scanner 3 and the door 72 is in the open position or the closed position based on whether or not current is detected from the light receptor 65. If the ASIC 107 detects that the scanner 3 or the door 72 is in the open position, input of controls from the control panel 6 via the controller 101 is prevented, which prevents the scanner 3 from scanning and the printer 2 from printing. Moreover, the control panel 6, the slot 7, a parallel interface 108, a USB interface 109 for transmitting data between the multifunction device 1 and an external device, may be connected to the ASIC 107.

In addition, a Network Control Unit ("NCU") 117 and a modem 118 for providing facsimile functions and talk functions, respectively, also may be connected to the ASIC 107.

Figure 11:
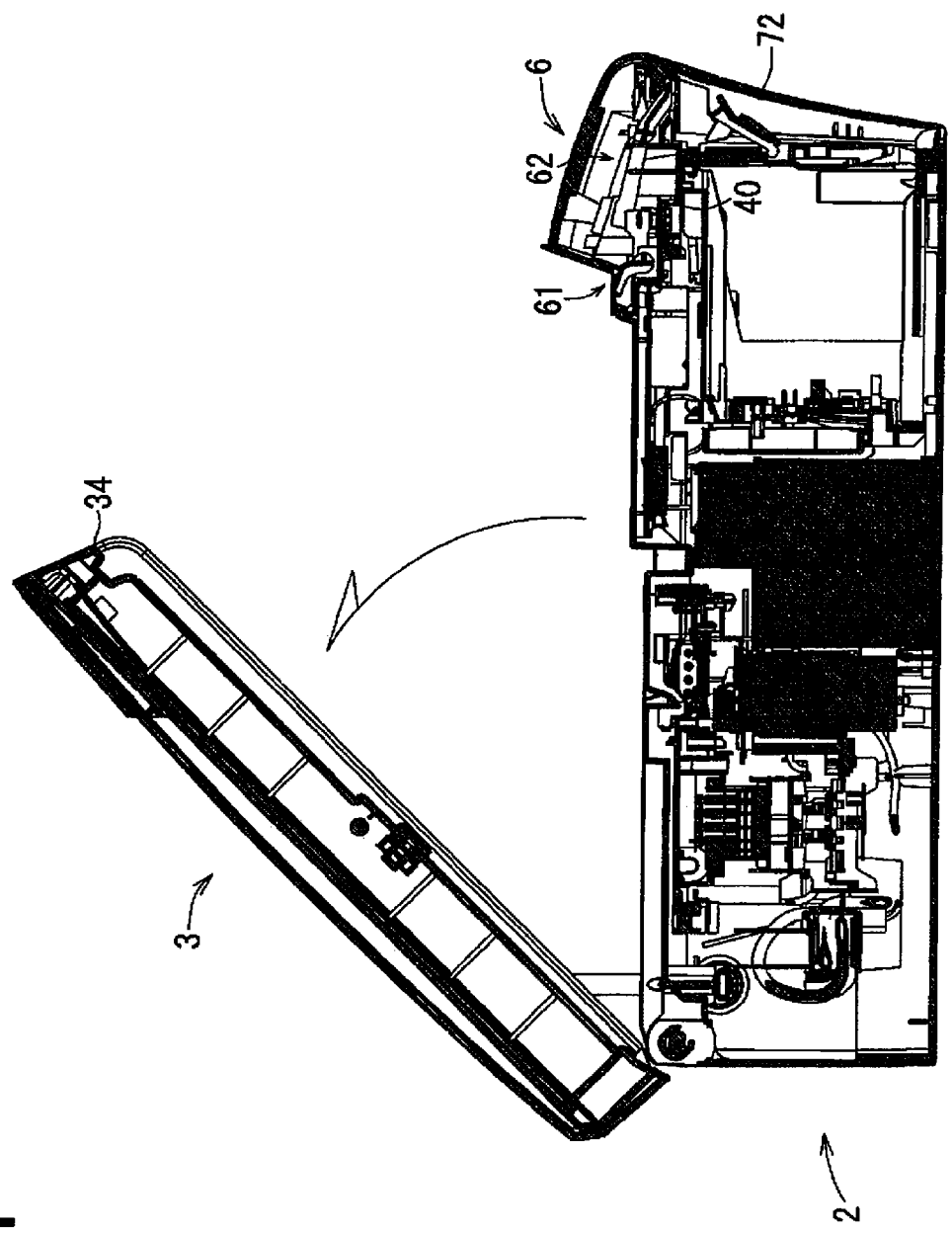
FIG. 11 is a cross-sectional view of the multifunction device of FIG. 1 with the scanner in the open position and the door in the closed position.
Figure 12:
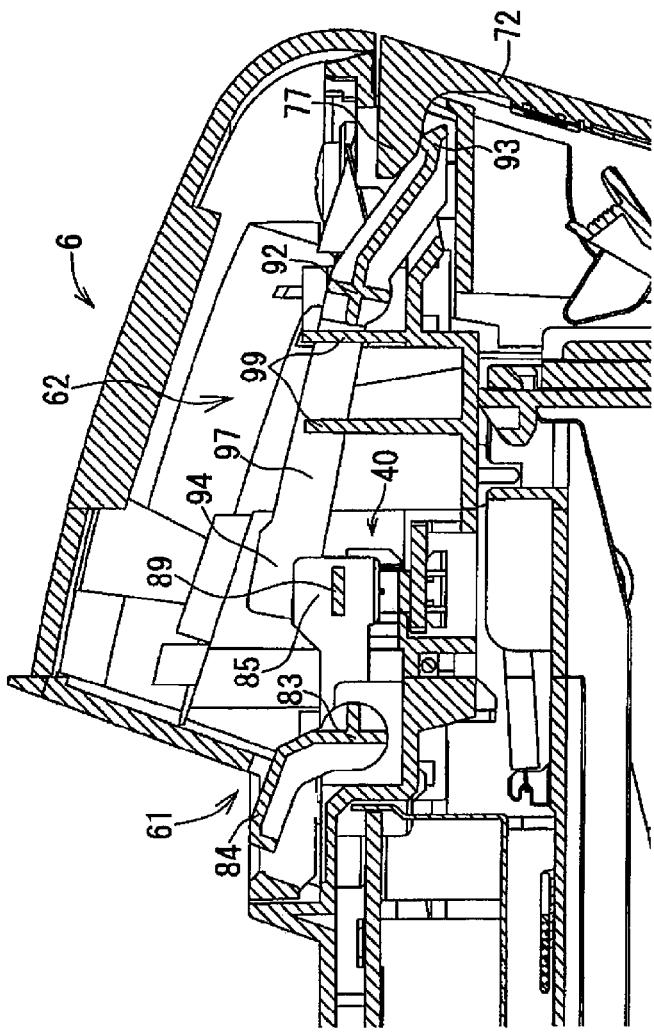
FIG. 12 is a magnified view of some of the elements of FIG. 11.
Figure 13:
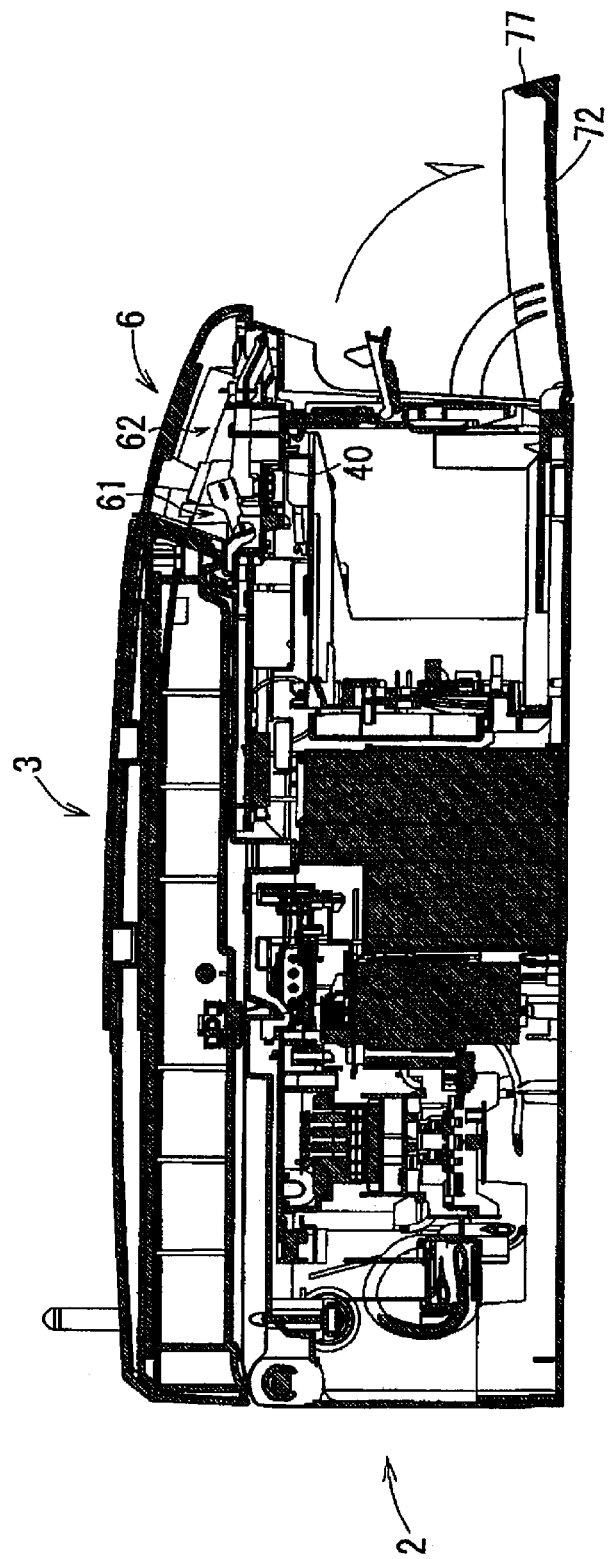
FIG. 13 is a cross-sectional view of the multifunction device of FIG. 1 with the scanner in the closed position and the door in the open position.
Figure 14:
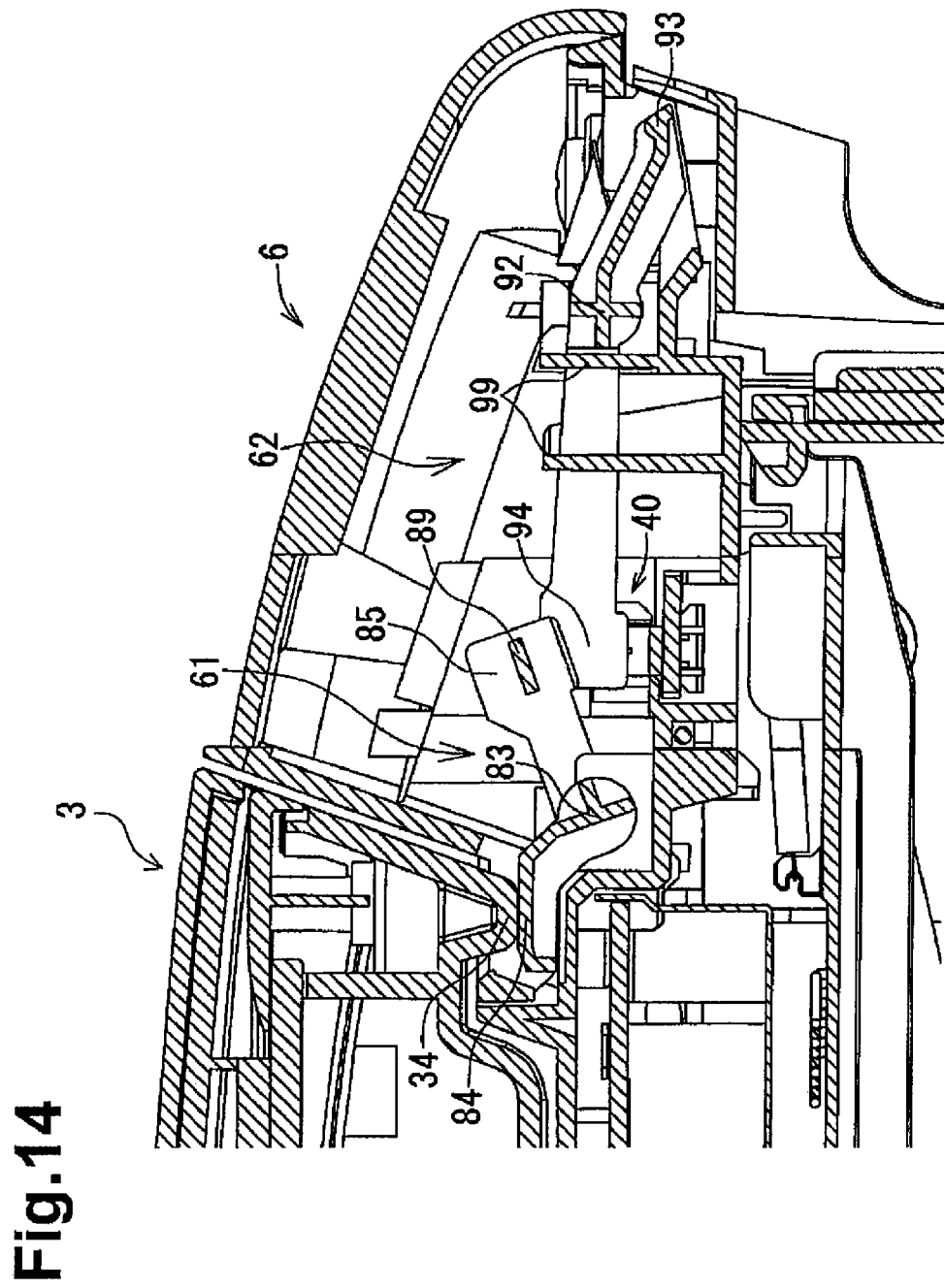
FIG. 14 is a magnified view of some of the elements of FIG. 13.
Figure 15:
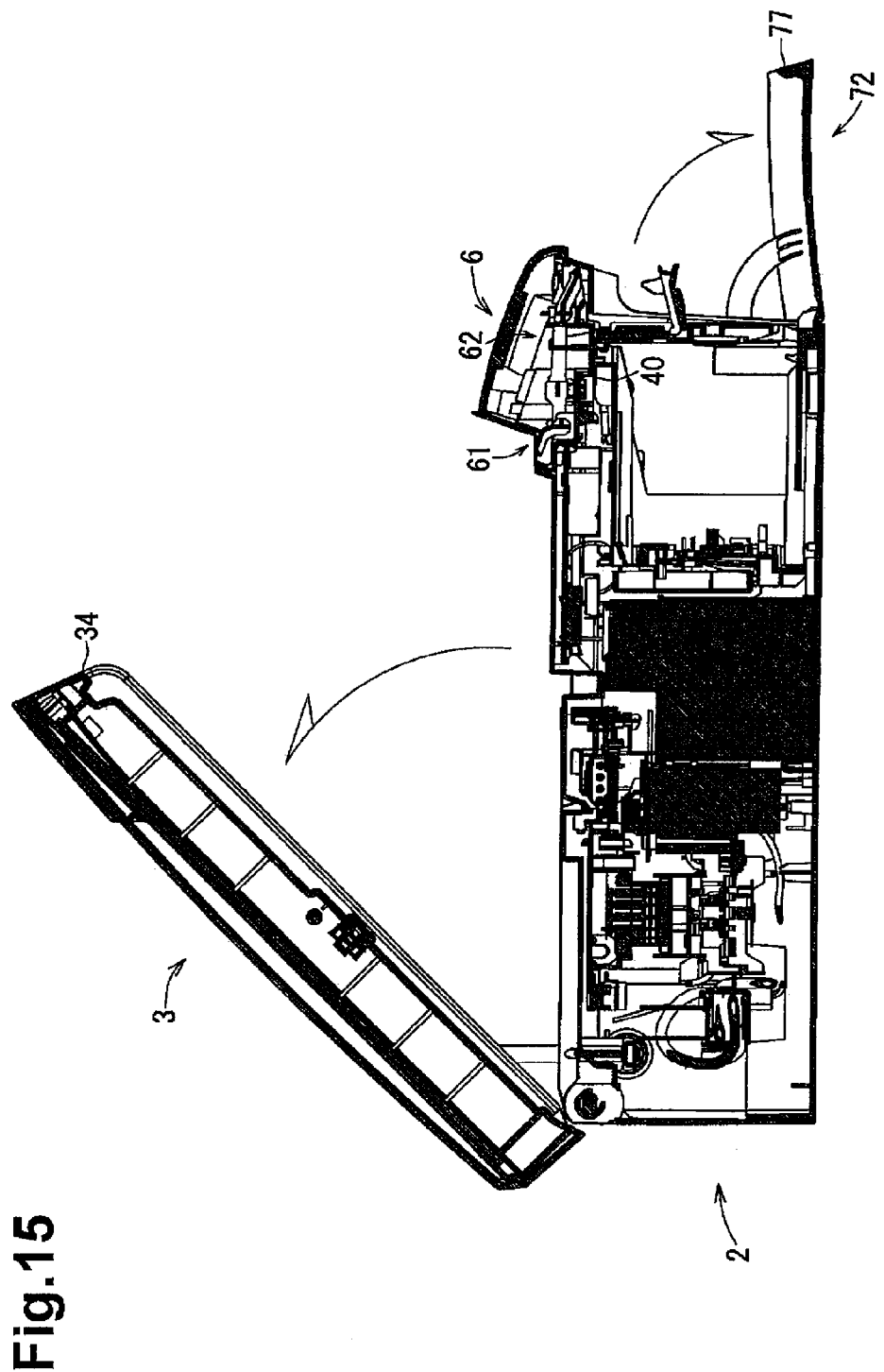
FIG. 15 is a cross-sectional view of the multifunction device of FIG. 1 with the scanner and the door in the open position.
Figure 16:
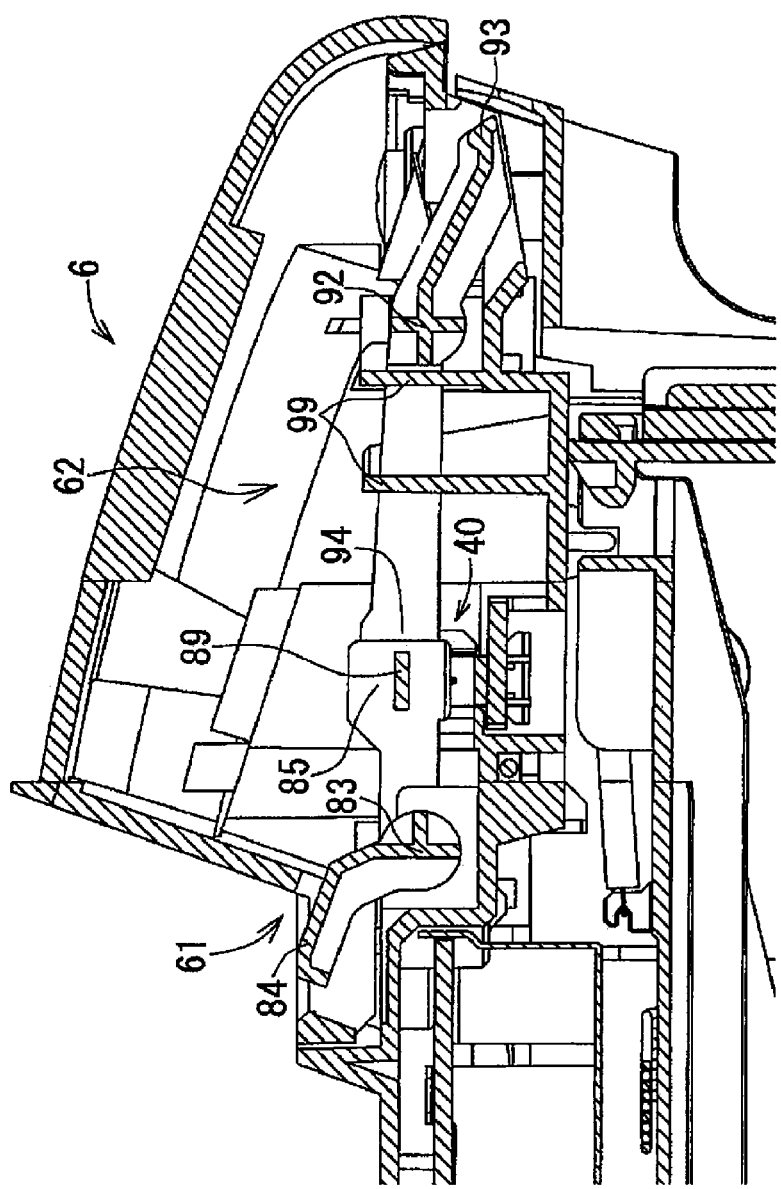
FIG. 16 is a magnified view of some of the elements of FIG. 15.

The following is description of an operation for detecting whether the scanner 3 and the door 72 is in the open position or the closed position. FIGS. 9 and 10 show the scanner 3 and the door 72 in the closed position, FIGS. 11 and 12 show the scanner 3 in the open position and the door 72 in the closed position, FIGS. 13 and 14 show the scanner 3 in the closed position and the door 72 in the open position, and FIGS. 15 and 16 show the scanner 3 and the door 72 in the open position.

Referring to FIGS. 9 and 10, the first actuator 61 may be supported on the device body 10 by shaft 83. When the scanner 3 is closed, the connector 84 of the corresponding first actuator 61 is in contact with the first pusher 34 of the scanner 3. Consequently, the shield 85 is pushed away from the space 63. Moreover, the first actuator 61 is elastically forced by the helical coil spring 90 in the direction in which the shield 85 moves into the space 63. Consequently, the shield 85 is biased to enter the space 63. Here, because the pushing force of the first pusher 34 is greater than the biasing force of the helical coil spring 90, the shield 85 of the first actuator 61 is positioned away from the space 63.

The second actuator 62 may be supported on the device body 10 by shaft 92. When the door 72 is closed, the contact 93 for the corresponding second actuator 62 is in contact with the second pusher 77 of the door 72. Consequently, the shield 94 is pushed to move away from the space 63. Moreover, the second actuator 62 is elastically forced by the helical coil spring 100 in the direction in which the shield 94 moves into the space 63. Consequently, the shield 94 is biased to enter the space 63. Here, because the pushing force of the second pusher 77 is greater than the biasing force of the helical coil spring 100, the shield 94 of the second actuator 62 is positioned away from the space 63.

As such, as shown in FIGS. 9 and 10, the space 63 is open when the scanner 3 and door 72 are both closed, causing the light receptor 65 to receive light from the light emitter 64. Moreover, an electrical current based on the strength of the light received by the light receptor 65 is output from the light receptor 65, thus, in controller 101, the light path of the light sensor 40 is opened by the first actuator 61 and the second actuator 62, such that the scanner 3 and door 72 are both determined to be closed.

As shown in FIGS. 11 and 12, when the scanner 3 is opened, e.g., to perform maintenance, the contact 84 of the corresponding first actuator 61 ceases to contact the first presser 34 of the scanner 3. This releases the pushing force applied to the contact 84. As shown in FIGS. 5 and 6, the first actuator 61 is biased by the helical coil spring 90 in the direction in which the shield 85 advances into the space 63. With the pushing force of the first pusher 34 released, the first actuator 61 is biased by the helical coil spring 90, and this biasing force rotates the first actuator 61, causing the shield 85 to enter the space 63. At this time, the stopper 89 contacts the light receptor 65 of the light sensor 40, positioning the shield 85 at the predetermined blocking position. This blocks the path of light from the light emitter 64 to the light receptor 65, preventing the light receptor 65 from receiving light from the light emitter 64.

As shown in FIGS. 13 and 14, when the door 72 is opened, e.g., to replace an ink cartridge, the contact 93 of the corresponding second actuator 62 ceases to contact the second presser 77 of the door 72. This releases the pushing force applied to the contact 93. As shown in FIGS. 5 and 6, the second actuator 62 is biased by the helical coil spring 100 in the direction in which the shield 94 advances into the space 63. With the pushing force of the second pusher 77 released, the second actuator 62 is biased by the helical coil spring 100, and this biasing force rotates the second actuator 62, causing the shield 94 to enter the space 63. At this time, the stopper 98 contacts the light receptor 64 of the light sensor 40, positioning the shield 94 at the predetermined blocking position. This blocks the path of light from the light emitter 64 to the light receptor 65, preventing the light receptor 65 from receiving light from the light emitter 64.

The first actuator 61 and the second actuator 62 may be positioned on opposite sides of the light sensor 40 in the detector 4. The shield of each of these detectors overlaps with the other shield blocking the light path in the direction of the light path. Specifically, as shown in FIG. 14, the shield 85 of the first actuator 61 overlaps with the shield 94 of the second actuator 62, positioned to block the light path, in the direction of the light path. In other words, the first actuator 61 and second actuator 62 are designed in such a way that the bottom edge of the shield 85 that opens the light path protrudes towards the space 63 slightly more than the top edge of the shield 94 that blocks the light path. Moreover, as shown in FIG. 12, when the shield 94 of the second actuator 62 is positioned to open the light path, it overlaps with the shield 84 of the first actuator 61, positioned to block the light path, in the direction of the light path. In other words, the first actuator 61 and second actuator 62 are designed in such a way that the bottom edge of the shield 94 that opens the light path protrudes towards the space 63 slightly more than the top edge of the shield 85 that blocks the light path. This prevents the shield 85 and the shield 94 from overlapping with each other in the rotating direction and thereby enabling their respective detectors 61 and 62 rotating without interference.

As shown in FIGS. 15 and 16, when the scanner 3 is opened, the first presser 34 of the scanner 3 ceases to be in contact with the contact 84 of the corresponding first actuator 61. With the pushing force of the first pusher 34 released, the first actuator 61 is biased by the helical coil spring 90, and this biasing force rotates the first actuator 61, causing the shield 85 to enter the space 63. At this time, the stopper 89 contacts the light receptor 65 of the light sensor 40, positioning the shield 85 at the predetermined blocking position.

When the door 72 is opened, the second presser 77 of the door 72 ceases to be in contact with the contact 93 of the corresponding second actuator 62. With the pushing force of the second pusher 77 released, the second actuator 62 is biased by the helical coil spring 100, and this biasing force rotates the second actuator 62, causing the shield 94 to enter the space 63. At this time, the stopper 98 contacts the light emitter 64 of the light sensor 40, positioning the shield 94 at the predetermined blocking position.

In his way, when either the scanner 3 or the door 72 are opened, at least one of either the first actuator 61 or the second actuator 62 moves into the space 63 in sync with the opening motion. This blocks the light path from the light emitter 64 to the light receptor 65. When light ceases to be received by the light receptor 65, no electrical current is output from the light receptor 65. Based on this change in the electrical current, the controller 101 is able to determine that the light path of the light sensor 40 has been blocked by either the first actuator 61 or the second actuator 62, e.g., it is able to detect that at least one of either the scanner 3 or the door 72 has been opened. If the controller 101 determines that the scanner 3 or the door 72 has been opened, it prevents the printer 2 from printing or prevents the scanner 3 from scanning.

When the previously opened rotating member subsequently is closed, the corresponding detector moves away from the space 63 in sync with the closing motion of the rotating part. The light path in the light sensor 40 is opened as the shield 85 and the shield 94 move away, permitting the light receptor 65 to receive light from the light emitter 64. When the controller 101 determines based on the current output from the light receptor 65 that the scanner 3 and the door 72 have been closed, it allows the printer 2 to print and the scanner 3 to scan.

In this manner, the light path is open if both the scanner 3 and the door 72 are closed, and the light path is blocked if either the scanner 3 or the door 72 are open. This allows for the detection of the open/closed position of multiple independently opened/closed rotating members based on whether the light path in a single light sensor 40 is blocked or opened. Moreover, a size of the multifunction device 1 may be reduced.

What is claimed is:

1. An image processing device comprising:
   a first rotating member configured to selectively rotate between a first open position and a first closed position;
   a second rotating member configured to selectively rotate between a second open position and a second closed position;
   a first actuator configured to rotate in sync with the first rotating member;

a second actuator configured to rotate in sync with the second rotating member; and a light sensor comprising:

a light emitter configured to emit a light; and a light receptor positioned opposite the light emitter, wherein the light receptor is configured to receive the light from the light emitter, and a space is formed between the light emitter and the light receptor, wherein the first actuator is selectively positioned within the space and outside of the space based on the position of the first rotating member, and the second actuator is selectively positioned within the space and outside of the space based on the position of the second rotating member, wherein the light sensor detects whether the first rotating member is in the first open position or the first closed position based on whether the first actuator is positioned within the space or outside of the space, and the light sensor detects whether the second rotating member is in the second open position or the second closed position based on whether the second actuator is positioned within the space or outside of the space.

2. The image processing device of claim 1, wherein the first actuator comprises a first shaft, a first contact that rotates around the first shaft when contacted by the first rotating member, and a first shield that is configured to move in and out of the light sensor space upon being rotated together with the first contact around the first shaft; and the second actuator comprises a second shaft, a second contact that rotates around the second shaft when contacted by the second rotating member, and a second shield that configured to move in and out of the light sensor space upon being rotated together with the second contact around the second shaft.

3. The image processing device of claim 2, wherein each of the first shield and the second shield is biased to be positioned within the space.

4. The image processing device of claim 2, wherein each of the first shield and the second shield has a substantially flat plane shape which extends in a direction of rotation of the first shield and the second shield, respectively, and the first shield is arranged in parallel to the second shield.

5. The image processing device of claim 2, further comprising a guide member which guides the first shield to a first predetermined position within the space, and the second shield to a second predetermined position within the space.

6. The image processing device of claim 2, the first rotating member further comprises a first pusher configured to push the first contact away from the space when the first rotating member is in the first closed position, and the second rotating member further comprises a second pusher configured to push the second contact away from the space when the second rotating member is in the second closed position.

7. The image processing device of claim 1, wherein the image processing device comprises a scanner and a printer, and the printer comprises a door, wherein the first rotating member comprises the scanner, and the second rotating member comprises the door.

8. The image processing device of claim 1, wherein the first actuator and the second actuator are disposed opposite to each other across the light sensor, and one of a first shield of the first actuator and a second shield of the second actuator that is disposed outside of the space overlaps the other of the first shield or the second shield that is disposed within the space.

9. The image processing device of claim 1, further comprising a first shield of the first actuator comprising a first stopper configured to contact the light sensor and to position the first shield in a predetermined portion within the space and a second shield of the second actuator comprising a second stopper configured to contact the light sensor and to position the second shield in a predetermined portion within the space.

* * * * *